United States Patent [19]

Kempter et al.

[11] Patent Number: 4,831,106

[45] Date of Patent: May 16, 1989

[54] LOW-FORMALDEHYDE BINDERS

[75] Inventors: Fritz E. Kempter, Mannheim; Franz Matejcek, Lambsheim; Werner Neubach, Ludwigshafen; Gerd Busse, Mutterstadt, all of Fed. Rep. of Germany

[73] Assignee: BASF Aktiengesellschaft, Ludwigshafen, Fed. Rep. of Germany

[21] Appl. No.: 158,756

[22] Filed: Feb. 22, 1988

[30] Foreign Application Priority Data

Mar. 11, 1987 [DE] Fed. Rep. of Germany ....... 3707689

[51] Int. Cl.$^4$ .................... C08G 2/08; C08G 6/02
[52] U.S. Cl. ..................... 528/227; 528/229; 528/230; 528/245; 528/248; 528/252; 528/256; 528/259; 544/309; 544/314; 544/315
[58] Field of Search ............... 528/227, 229, 230, 245, 528/248, 252, 256, 259; 544/309, 314, 315

[56] References Cited

U.S. PATENT DOCUMENTS

| | | | |
|---|---|---|---|
| 3,962,166 | 6/1976 | Gordon | 528/259 |
| 4,285,690 | 8/1981 | North | 8/186 |
| 4,343,655 | 8/1982 | Dodd et al. | 106/214 |
| 4,625,029 | 11/1986 | Floyed et al. | 544/309 |

FOREIGN PATENT DOCUMENTS 24474 3/1981 Japan.
18551 1/1985 Japan.

OTHER PUBLICATIONS

Methodern Der Organischem Chemie, Houben-Weyl, vol. XIV/2, 1963, pp. 416-423.
Melliand Textilberichte, 54 (1973) pp. 415-418, 529-532, 669-675.

*Primary Examiner*—Morton Foelak
*Assistant Examiner*—Samuel A. Acquah
*Attorney, Agent, or Firm*—Keil & Weinkauf

[57] ABSTRACT

A low-formaldehyde binder consists essentially of
(A) from 5 to 80% by weight of a water-soluble condensation product of carbonyl number 0-200 which has been prepared by alkaline condensation from 0.1 to 0.4 mole of an aliphatic or cycloaliphatic condensable ketone and 1 mole of formaldehyde, and
(B) from 20 to 95% by weight of 4,5-dihydroxyimidazolidin-2-one and/or an unetherified, partially etherified or completely etherified condensation product thereof with an aliphatic monoaldehyde or dialdehyde.

8 Claims, No Drawings

LOW-FORMALDEHYDE BINDERS

The present invention relates to low-formaldehyde binders which consist essentially of (A) from 5 to 80% by weight of a water-soluble condensation product of carbonyl number 0–200 which has been prepared by alkaline condensation from 0.1 to 0.4 mole of an aliphatic or cycloaliphatic condensable ketone and 1 mole of formaldehyde, and (B) from 20 to 95% by weight of 4,5-dihydroxyimidazolidin-2-one and/or an unetherified, partially etherified or completely etherified condensation product thereof with one or more of the aldehydes formaldehyde, glyoxal or glutardialdehyde, and to the use thereof.

Ketone-formaldehyde condensation products are known and described for example in Houben-Weyl, Methoden der organischen Chemie, volume XIV/2, 1963, p. 416 ff. Depending on the molar ketone:formaldehyde ratio, the products are high molecular weight or high-methylol or cyclic acetals or ethers.

The high-methylol ketone-formaldehyde condensation products can be combined with a wide range of compounds, such as amino or phenolic resins, which are condensable with formaldehyde. For instance, JP Laid-Open Application No. 85/18,551 describes a coating agent which is based on ketone-formaldehyde condensation products with methylolated and etherified melamine resins and which is cured by acid catalysis. These products have in some instances only a low solubility in water, which necessitates the use of organic solvents.

JP Laid-Open Application No. 81/24,474 describes an adhesive which is based on an acetone-formaldehyde condensation product incorporating for example a urea-formaldehyde condensation product and which is cured under alkaline conditions.

All these products have an undesirably high free formaldehyde content. If the coating agents are cured at elevated temperatures, undesirably large amounts of the built-in formaldehyde are split off.

It is an object of the present invention to provide binders which are low not only in terms of free formaldehyde but also in terms of thermally detachable formaldehyde. In addition, they should be water-soluble and storable.

We have found that this object is achieved with a binder which consists essentially of (A) from 5 to 80% by weight of a water-soluble condensation product of carbonyl number 0–200 which has been prepared by alkaline condensation from 0.1 to 0.4 mole of an aliphatic or cycloaliphatic condensable ketone and 1 mole of formaldehyde, and (B) from 20 to 95% by weight of 4,5-dihydroxyimidazolidin-2-one and/or an unetherified, partially etherified or completely etherified condensation product thereof with an aliphatic monoaldehyde or dialdehyde.

Suitable for preparing component (A) are the low members of the homologous series of the dialkyl ketones, such as acetone, methyl ethyl ketone, diacetone alcohol and cyclohexanone. The use of higher molecular weight ketones is limited by the desire for the corresponding condensation products to be soluble in water. Particular preference is given to using acetone.

Depending on the number of hydroxymethylatable acidic OH groups available, every ketone has a different optimum molar ketone:formaldehyde ratio.

In the case of acetone, which has the highest possible number of reaction OH bonds (6), a molar ketone: formaldehyde ratio from 1:3.75 to 1:7.0, preferably from 1:4.0 to 1:6.0, is recommended. For ketones having 5 reactive CH bonds the following ratios are applicable: from 1.3.0 to 1:6.0, preferably from 1:3.5 to 1:5.0. If ketone and formaldehyde are used in the stated ratios, virtually all the formaldehyde is converted, so that the aqueous reaction solution contains less than 1.5% by weight of free formaldehyde, even as a rule less than 0.2% by weight.

The alkaline condensation of the ketone with formaldehyde is preferably carried out in aqueous solution, possibly in the presence of alcohols, at from 20° to 70° C., preferably at from 30° to 60° C., lower temperatures being preferred particularly toward the end of the reaction, ie. as low free formaldehyde contents. Preferably, the condensation is carried out at a pH from 8 to 12, in particular at pH 10–11.5.

To maximize the conversion of keto groups on the ketone resin, a high conversion being indicated by the low carbonyl number (mg of KOH/g of solid as, determined by the Heidbrink method of German Standard Specification DIN 53,189) from 0 to 200, preferably from 60 to 180, the condensation requires from 5 to 15% by weight of base, preferably from 6 to 12% by weight thereof, based on condensate. The base is removed in the form of insoluble salts thereof. Owing to the large number of insoluble salts, the base used in a conventional manner is preferably calcium hydroxide, which is separated off in the form of its formates, oxalates, phosphates or sulfates. Other suitable bases are for example sodium hydroxide, potassium hydroxide, sodium carbonate, potassium carbonate and barium hydroxide.

Condensation products (A) are colorless or slightly colored viscous substances. The ash content after removal of, for example, calcium formate is in general found to be from 0.1 to 0.3% by weight. The solids contents of the products can be raised to about 98% by weight.

The solids content was determined in accordance with modified German Standard Specifications DIN 53,216 and DIN 53,189 (see page 6).

Component (B) serves as a crosslinking agent for the ketone-formaldehyde condensation products. Component (B) comprises the cyclic urea 4,5-dihydroxyimidazolidin-2-one and/or condensation products thereof with an aliphatic monoaldehyde or dialdehyde of up to 5 carbon atoms, for example formaldehyde, glyoxal or glutardialdehyde, even mixtures thereof being possible. For example, 1 mole of 4,5-dihydroxyimidazolidin-2-one may be reacted with two moles of formaldehyde to prepare 1,3-dimethylol-4,5-dihydroxyimidazolidin-2-one which may be condensed with from 0.5 to 2 moles of glyoxal.

The molar urea:aldehyde ratio used ranges in general from 0.1:1 to 10:1, preferably from 0.5:1 to 2:1, based on unsubstituted urea.

It is also possible for alcohols, for example methanol, ethanol, n-propanol, n-butanol, methylglycol or mixtures thereof, to be present in the condensation reaction, in which case partially or completely etherified condensation products are formed.

Condensation products based on cyclic ureas and glyoxal are described for example in U.S. Pat. Nos. 4,285,690 and 4,343,655.

To prepare the binders according to the invention, from 5 to 80% by weight of component (A) are mixed with from 20 to 95% by weight of component (B). The preferred mixing ratio is 10–70% by weight of component (A): 30–90% by weight of component (B). In general, precondensation of the binder according to the invention from (A) and (B) is not necessary. If desired, in particular in the event of compatibility problems between the components or to effect partial etherification of the crosslinking agent, such a precondensation may be carried out at from 40° to 70° C. in the presence or absence of from 0.1 to 1.0% by weight of p-toluenesulfonic acid.

The binders are treated with from 0.1 to 5% by weight, preferably from 1 to 3% by weight, of a thermal curing catalyst and are diluted with water to from 10 to 25% by weight strength.

Suitable catalysts are acids, or latent acids, and metal salts. Preference is given to p-toluenesulfonic acid, ammonium, chloride, ammonium hydrogenphosphate and the nitrates, chlorides and acetates of magnesium and calcium. The binders are cured on the substrates under conventional conditions, for example at from 120° to 250° C. in from 1 to 30 minutes, a higher temperature corresponding to a shorter time and vice versa.

The binders according to the invention are suitable for producing coating agents.

The aqueous resin solutions are suitable in particular as coating, impregnating and binding or bonding agents for bonded fiber webs. The bonded fiber webs can consist of natural or synthetic organic fibers, for example polyamides, polyethylene terephthalate, polypolypropylene, cellulose and/or viscose, and also mineral fibers, for example rockwool or glass fibers, the fibers being of customary length and thickness. In the consolidation of webs the resin solutions produced according to the invention are generally used in a concentration from 10 to 25% by weight and applied by impregnating the webs by passing the webs for example through a bath of the impregnating resin and then squeezing off the impregnated web in a conventional manner. The webs can also be sprayed with the resin solutions or be treated with foamed resin solutions. The impregnated webs, which may have been dried at from 15° to 25° C., are then conventionally heat-treated to cure the resins. The binders according to the invention have a long shelf life even in the presence of urea itself in amounts of 10% in aqueous solution with a free formaldehyde content from 0.1 to 1.0% by weight. The quantities of formaldehyde emitted in the course of curing, as measured by the method described in Melliand Textilber. 54 (1973), 415–418, 529–532 and 669–675, can be reduced down to values of 0.1%, based on solid resin.

The webs coated with the binders according to the invention have good mechanical properties, such as high breaking strength and high elongation and a surprisingly high water resistance, as revealed by the excellent values for the boil wash loss in the Table.

Preparation of Resin Components A

A/I Acetone-formaldehyde condensation product having a molar acetone-formaldehyde ratio of 1:5

31.75 g of technical grade calcium oxide were added at 40° C. to 131.25 g of acetone, 848.31 g of formalin (40% by weight strength aqueous solution), 961.0 g of water and 131.25 g of butanol and thoroughly stirred in. Once a free formaldehyde content of 0.28% by weight had been reached the reaction mixture was brought with formic acid to a pH of 6.5, and water was distilled off under reduced pressure at a temperature not higher than 70° C. The residue was diluted with 817 g of methanol and filtered through a suction filter. Methanol was removed under reduced pressure at a temperature not above 70° C. and the residue was diluted with 130 g of water.

500 g were obtained of a slightly yellowish product whose solids content as measured by German Standard Specification DIN 53,216 (2 g sample kept at 125° C. for 2 hours) was found to be 70% by weight, the water content being 24.8% by weight. The solids content as measured by the Heidbrink*) flat weighing bottle method was 74.1% by weight, the ash content was 0.11% by weight, the free formaldehyde content was 0.55% by weight and the carbonyl number was 105.0 mg of KOH/g of Heidbrink solids.

A/II Acetone-formaldehyde condensation product having a molar acetone:formaldehyde ratio of 1:4:

33 g of technical grade calcium oxide were added at 40° C. to 132.0 g of acetone, 1203 g of formalin (40% strength by weight aqueous solution) and 180 g of methanol and thoroughly stirred in. Once a free formaldehyde content of 0.9% by weight had been reached the reaction mixture was acidified with formic acid to pH 6.5 and (*)as defined in German Standard Specification DIN 53,189, 0.2 g sample of 70% strength by weight aqueous solution, the test bottle being dried over P$_2$O$_5$ at room temperature in a water pump vacuum for 2 hours with and without substance) worked up in the same way as product A/I using 1400 g of methanol. The yield was 612.0 g.

The solids content of the slightly colored product was 80.0% by weight, the Heidbrink*) solids content was 93.5% by weight, the ash content was 0.45% by weight, the free formaldehyde content was 0.85% by weight and the carbonyl number was 184 mg of KOH/g of Heidbrink*) solids.

(*)as defined in German Standard Specification DIN 53,189, 0.2 g sample of 70% strength by weight aqueous solution, the test bottle being dried over P$_2$O$_5$ at room temperature in a water pump vacuum for 2 hours with and without substance)

EXAMPLE 1

A needled polyester spunbonded web of about 190 g/m$^2$ was impregnated with a 12% strength by weight aqueous binder liquor, and the excess binder liquor was squeezed off. The squeeze pressure was adjusted in such a way that after the web had been dried at 170° C. the binder content was about 20% by weight, based on the weight of fiber. The impregnated and dried web had a weight of about 230 g/m$^2$.

The binder liquor comprised
50 g (as solid) of a resin as per method A/I
50 g (as solid) of 1,3-dimethylol-4,5-dihydroxyimidazolidin-2-one
1 g of ammonium chloride The breaking strength and washoff losses of the webs are summarized in the Table.

EXAMPLE 2

Using the method of Example 1 a needled polyester spunbonded web was impregnated with a 12% strength by weight binder liquor comprising
50 g (as solid) of a resin as per method A/I
50 g (as solid) of 1,3-dimethylol-4,5-dihydroxyimidazolidin-2-one
3 g (as solid) of ammonium chloride and dried.

EXAMPLE 3

The method of Examples 1 and 2 was followed to impregnate with an approximately 12% strength by weight binder liquor comprising
60 g (as solid) of a resin as per method A/I
40 g (as solid) of 1,3-dimethylol-4,5-dihydroxyimidazolidin-2-one
1 g (as solid) of ammonium chloride.

EXAMPLE 4

The method of Examples 1 and 2 was followed to impregnate with an approximately 12% strength by weight binder liquor comprising
60 g (as solid) of a resin as per method A/I
40 g (as solid) of 1,3-dimethylol-4,5-dihydroxyimidazolidin-2-one
3 g (as solid) of ammonium chloride.

TABLE

|  | Breaking strength [N/5 cm of width] | Elongation [%] | Washoff loss [%] |
|---|---|---|---|
| Web of Example 1 | 637 | 62 | 0.8 |
| Web of Example 2 | 644 | 60 | 1.3 |
| Web of Example 3 | 641 | 62 | 0.9 |
| Web of Example 4 | 624 | 61 | 1.3 |

We claim:

1. A low-formaldehyde binder consisting essentially of
   (A) from 5 to 80% by weight of a water-soluble condensation product having a carbonyl number of 0–200 which has been prepared by alkaline condensation from 0.1 to 0.4 mole of an aliphatic or cycloaliphatic condensable ketone and 1 mole of formaldehyde, and
   (B) from 20 to 95% by weight of 4,5-dihydroxyimidazolidin-2-one and/or an unetherified, partially etherified or completely etherified condensation product thereof with an aliphatic monoaldehyde or dialdehyde.

2. A binder as defined in claim 1 using a component (A) having a carbonyl number from 40 to 180 and prepared from acetone and formaldehyde in a molar ratio from 1:4 to 1:6.

3. A binder as defined in claim 1 where component (B) comprises 1,3-dimethylol-4,5-dihydroxyimidazolidin-2-one.

4. An aqueous solution of a binder as defined in claim 1.

5. A web composed of inorganic or organic fiber material and bonded with a cured binder as defined in claim 1.

6. A binder as defined in claim 2 where component (B) comprises 1,3-dimethylol-4,5-dihydroxyimidazolidin-2-one.

7. An aqueous solution of a binder as defined in claim 6.

8. A web composed of inorganic or organic fiber material and bonded with a cured binder as defined in claim 6.

* * * * *